United States Patent
Elsakhawy

(10) Patent No.: US 12,335,128 B2
(45) Date of Patent: Jun. 17, 2025

(54) SYSTEM AND METHOD FOR MANAGING CAPACITY THRESHOLDS IN A NETWORK

(71) Applicant: RAKUTEN MOBILE, INC., Tokyo (JP)

(72) Inventor: Mahmoud Mohamed Elsakhawy, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 6 days.

(21) Appl. No.: 18/193,873

(22) Filed: Mar. 31, 2023

(65) Prior Publication Data

US 2024/0333625 A1    Oct. 3, 2024

(51) Int. Cl.
   *H04L 43/16*      (2022.01)
   *H04L 41/0813*    (2022.01)
   *H04L 43/08*      (2022.01)

(52) U.S. Cl.
   CPC .......... *H04L 43/16* (2013.01); *H04L 41/0813* (2013.01); *H04L 43/08* (2013.01)

(58) Field of Classification Search
CPC .. G06F 11/34; G06F 11/3409; G06F 11/3466; G06F 11/3495; H04L 41/0627; H04L 41/0654; H04L 41/0659; H04L 41/066; H04L 41/0663; H04L 41/08; H04L 41/0803; H04L 41/0813; H04L 41/0816; H04L 41/0823; H04L 41/0886; H04L 41/0894; H04L 43/08; H04L 43/0876; H04L 43/091; H04L 43/16;
(Continued)

(56) References Cited

U.S. PATENT DOCUMENTS

2003/0079160 A1*   4/2003   McGee ............... G06F 11/3452
                                                                  714/39
2004/0088406 A1*   5/2004   Corley .................... H04L 43/16
                                                                  709/224
(Continued)

OTHER PUBLICATIONS

Breitgand, David, Ealan Henis, and Onn Shehory. "Automated and adaptive threshold setting: Enabling technology for autonomy and self-management." Second International Conference on Autonomic Computing (ICAC'05). IEEE, 2005. (Year: 2005).*
(Continued)

*Primary Examiner* — Vivek Srivastava
*Assistant Examiner* — William C McBeth
(74) *Attorney, Agent, or Firm* — Sughrue Mion, PLLC

(57) ABSTRACT

Provided are system, method, and device for managing capacity thresholds in a network. According to embodiments, the system may include: a memory storage storing computer-executable instructions; and at least one processor communicatively coupled to the memory storage, wherein the at least one processor may be configured to execute the instructions to: obtain information associated with a capacity factor of a node; determine, based on the received information, whether the capacity factor violates an associated first threshold; based on determining that the capacity factor violates the first threshold, determine whether a key performance indicator (KPI) associated with the node has varied; based on determining that the KPI has not varied, adjust the first threshold; and based on determining that the KPI has varied, perform an action to manage the node.

9 Claims, 6 Drawing Sheets

(58) Field of Classification Search
CPC ............. H04L 41/0661; H04L 41/0681; H04L 41/5009; H04L 41/06; H04L 41/0631; H04L 41/5067; H04L 41/5074; H04L 43/0829; H04L 43/087
See application file for complete search history.

(56) References Cited

U.S. PATENT DOCUMENTS

| | | | | |
|---|---|---|---|---|
| 2006/0293777 | A1* | 12/2006 | Breitgand | H04L 43/16 700/108 |
| 2012/0158949 | A1* | 6/2012 | Lee | H04L 41/0894 709/224 |
| 2015/0149627 | A1* | 5/2015 | Zhao | H04L 41/0886 709/224 |
| 2018/0048527 | A1* | 2/2018 | Ganjam | H04L 41/5067 |
| 2020/0007410 | A1* | 1/2020 | Walsh | H04L 43/08 |
| 2020/0034746 | A1* | 1/2020 | Poitras | G06F 11/3409 |
| 2020/0092159 | A1* | 3/2020 | Thampy | H04L 43/08 |
| 2020/0235986 | A1* | 7/2020 | Embarmannar Vijayan | H04L 43/16 |
| 2021/0126834 | A1* | 4/2021 | Azzam | H04L 43/0829 |
| 2022/0029901 | A1* | 1/2022 | Varnavas | H04L 43/16 |
| 2022/0108335 | A1* | 4/2022 | Kaveetil | G06Q 10/04 |
| 2023/0300040 | A1* | 9/2023 | Bull | H04L 43/16 709/224 |

OTHER PUBLICATIONS

Breitgand, David, et al. "Efficient control of false negative and false positive errors with separate adaptive thresholds." IEEE Transactions on Network and Service Management 8.2 (2011): 128-140. (Year: 2011).*

Breitgand, David, et al. "Performance management via adaptive thresholds with separate control of false positive and false negative errors." 2009 IFIP/IEEE International Symposium on Integrated Network Management. IEEE, 2009. (Year: 2009).*

Penido, G., J. M. Nogueira, and C. Machado. "An automatic fault diagnosis and correction system for telecommunications management." Proceedings of the Sixth IFIP/IEEE International Symposium on Integrated Network Management. IEEE, 1999. (Year: 1999).*

* cited by examiner

| Network Node | Capacity Factor 1 | | ... | Capacity Factor N | |
|---|---|---|---|---|---|
| | 1st Threshold | 2nd Threshold | | 1st Threshold | 2nd Threshold |
| Node 1 | Config. 1 | Config. 2 | ... | Config. N1 | Config. N2 |
| ... | ... | ... | ... | ... | ... |
| Node N | Config. NX | Config. NY | ... | Config. NA | Config. NB |

SYSTEM AND METHOD FOR MANAGING CAPACITY THRESHOLDS IN A NETWORK

TECHNICAL FIELD

Systems, methods, and devices consistent with example embodiments of the present disclosure relate to a telecommunication network, and more specifically, relate to managing thresholds associated with one or more capacity factors of one or more network nodes in the telecommunication network.

BACKGROUND

The capacity of a telecommunication network (may be referred to as "network capacity" herein) may refer to the maximum amount of data or information the network may transfer between different locations or nodes over a given time, typically defined in bits per second (bps) or bytes per second (Bps). Network capacity is, amongst others, one of the most important parameters in defining quality, resiliency, and stability of the network. Thus, a network operator often wants to proactively monitor, manage, and control the associated network to provide optimal network capacity, so as to ensure provision of optimal user experiences for the network users (e.g., customers or subscribers of the network).

Network capacity may be determined by a variety of factors, including the type of network nodes, the configuration of network nodes, or any other factor/parameter which may affect the network capacity (may be collectively referred to as "capacity factor" herein). For instance, a portion of the network nodes constituting the network may have at least one factor (e.g., computing power, memory, etc.) which may affect the performance that in turn affects the network capacity.

In the related art, the manufacturer or vendor of a network node may provide or recommend, to the network operator, a threshold for each of the capacity factors (may be referred to as "capacity threshold" herein) of the associated node, such that the network operator may monitor the capacity thresholds and perform appropriate actions to manage the node based thereon. Nevertheless, the approaches for managing the capacity thresholds in the related art have at least the following shortcomings.

To begin with, in the related art, the capacity thresholds are decided or configured by the node manufacturer/vendor based on best-assumption or approximation, which may not necessarily be accurate and may not guarantee optimal network capacity. Instead, the capacity thresholds provided or recommended by the node manufacturer/vendor may be lower than the required threshold, which in turn results in wastage of network resources. Conversely, said capacity thresholds may be higher than the required threshold, which in turn results in negative impact on user experience of the network users.

In view of the above, the capacity thresholds provided or recommended by the node manufacturer/vendor often need to be adjusted or be tuned in order to comply to the actual requirement. In this regard, in the related art, the network operator is required to manually tune the capacity thresholds, since the capacity thresholds are fixed and static. Further, the network operator usually tunes the capacity thresholds after receiving feedback (e.g., complaint, etc.) from the network users or after an incident affecting the network capacity has occurred. Such approaches in managing the capacity thresholds in the related art are burdensome for the network operators and are inefficient in ensuring good user experience for the network users. Particularly, the manual tuning of the capacity threshold in the related art becomes significantly burdensome, complex, and inefficient, due to the increasing number of node vendors/manufacturers and the dynamic nature of capacity requirements (which require more frequent and faster thresholds tuning).

Further, in the related art, the capacity thresholds is unduly difficult (if not impossible) to be tuned or adjusted to comply with multiple, different conditions. For instance, a capacity threshold may be provided or recommended for maintaining healthy operation of the associated node, but said threshold may be too low for maintaining good user experience for the network users. In this regard, if the capacity threshold is to-be tuned or adjusted to a higher threshold, said higher threshold may not be suitable for maintaining healthy operation of the node.

SUMMARY

Example embodiments of the present disclosure automatically and dynamically manage one or more capacity thresholds of one or more nodes, based on the node status and/or real-time conditions, reduce the burden of the network operator in managing the capacity thresholds, improve the accuracy of the capacity thresholds and reduce wastage of network resources, and ensure optimal user experiences.

According to embodiments, a system is provided. The system may include: a memory storage storing computer-executable instructions; and at least one processor communicatively coupled to the memory storage, wherein the at least one processor may be configured to execute the instructions to: obtain information associated with a capacity factor of a node; determine, based on the received information, whether the capacity factor violates an associated first threshold; based on determining that the capacity factor violates the first threshold, determine whether a key performance indicator (KPI) associated with the node has varied; based on determining that the KPI has not varied, adjust the first threshold; and based on determining that the KPI has varied, perform an action to manage the node.

According to embodiments, a method is provided. The method may be performed by at least one processor of a system, and may include: obtaining information associated with a capacity factor of a node; determining, based on the obtained information, whether the capacity factor violates an associated first threshold; based on determining that the capacity factor violates the first threshold, determining whether a key performance indicator (KPI) associated with the node has varied; based on determining that the KPI has not varied, adjusting the first threshold; and based on determining that the KPI has varied, performing an action to manage the node.

According to embodiments, a non-transitory computer-readable recording medium is provided. The non-transitory computer-readable recording medium may have recorded thereon instructions executable by at least one processor of a system to cause the at least one processor to perform a method including: obtaining information associated with a capacity factor of a node; determining, based on the obtained information, whether the capacity factor violates an associated first threshold; based on determining that the capacity factor violates the first threshold, determining whether a key performance indicator (KPI) associated with the node has varied; based on determining that the KPI has not varied, adjusting the first threshold; and based on determining that the KPI has varied, performing an action to manage the node.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 4 illustrates an example thresholds catalog, according to one or more embodiments;

DETAILED DESCRIPTION

Figure 1:
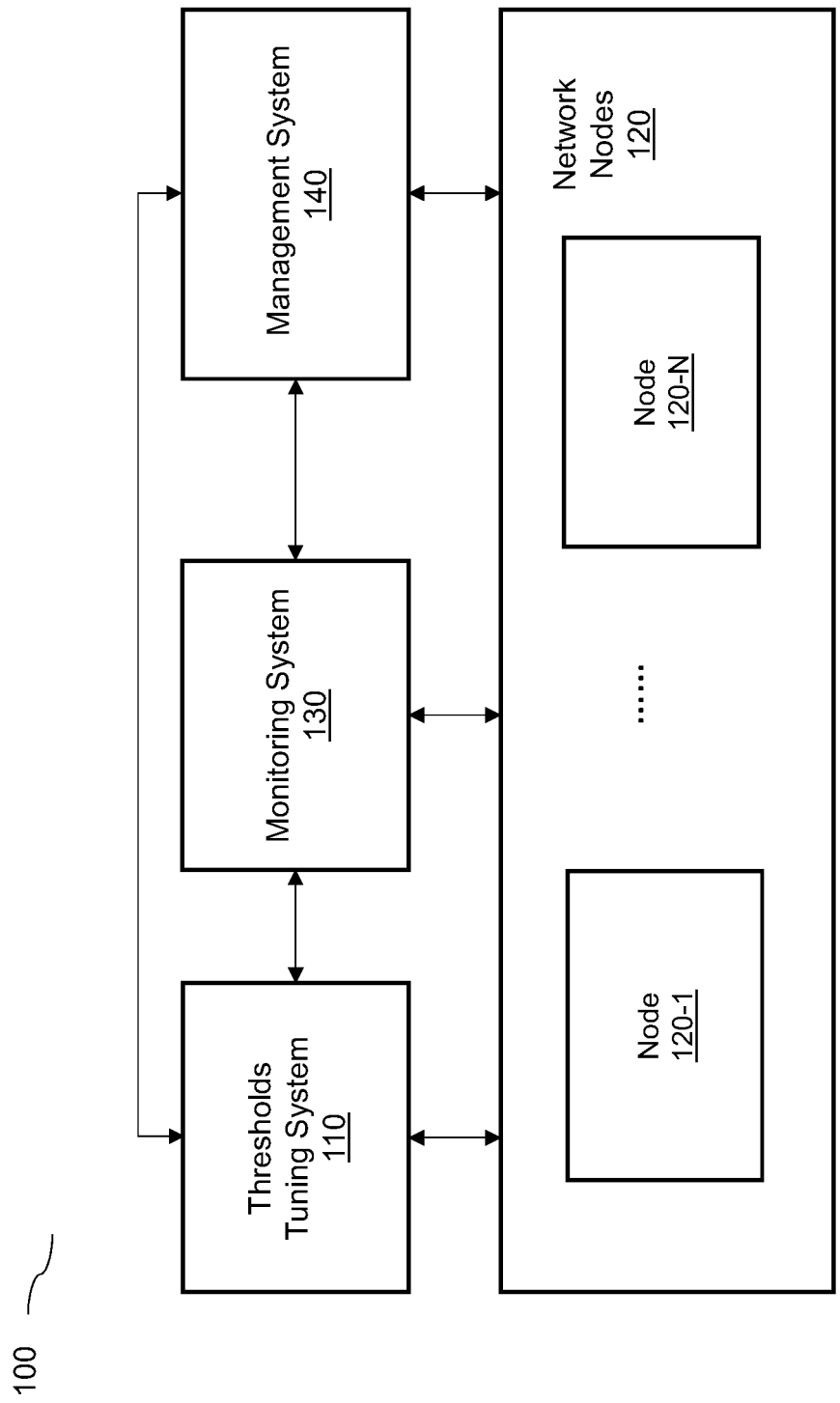
FIG. 1 illustrates a block diagram of an example system configuration for managing thresholds of one or more capacity factors, according to one or more embodiments.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Although the example embodiments of the present disclosure are described herein with reference to management of thresholds associated with at least one capacity factor of at least one network node, it is contemplated that one or more operations, features, configurations, or the like, described herein may be applicable to any component, node, system, or field, that require capacity management.

Systems, methods, devices, and the like, provided in the example embodiments of the present disclosure utilize a thresholds tuning system to manage a plurality of thresholds associated with one or more capacity factors of one or more nodes in a network. Simply put, one capacity factor may have a plurality of thresholds associated therewith, wherein each of the plurality of thresholds may be associated with a respective condition.

According to embodiments, the thresholds tuning system may continuously (or periodically) determine whether or not the threshold(s) has been violated, and may perform appropriate operations based thereon. For instance, based on determining that a first threshold associated with a capacity factor has been violated, the thresholds tuning system may verify whether or not the current parameter or configuration of the first threshold is accurately or appropriately configured. Accordingly, based on determining that the first threshold has been violated and the current parameter or configuration of the first threshold is accurately or appropriately configured, the thresholds tuning system may automatically determine an action to manage the associated node to remedy the root cause. Otherwise, the thresholds tuning system may appropriately adjust or tune the first threshold. The thresholds tuning system may manage the plurality of thresholds in a similar manner.

Ultimately, example embodiments of the present disclosure automatically and dynamically manage the thresholds (e.g., tune the thresholds in real-time or near real-time, etc.) based on the node status and/or real-time conditions, reduce the burden of the network operator in managing the capacity thresholds as in the related art, improve the accuracy of the thresholds and reduce wastage of network resources, and ensure optimal user experiences.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the threshold tuning system of the present disclosure, according to one or more embodiments, are provided in the following.

Example System Architecture

FIG. 1 illustrates a block diagram of an example system configuration 100 for managing one or more thresholds of one or more capacity factors of one or more nodes, according to one or more embodiments. As illustrated in FIG. 1, system configuration 100 may include a thresholds tuning system 110, a plurality of network nodes 120, a monitoring system 130, and a management system 140.

The network nodes 120 includes a plurality of nodes 120-1 to 120-N, each of which may include any suitable type of node which constitutes a network. For instance, the nodes 120-1 to 120-N may include one or more physical network nodes, such as (but are not limited to) routers, network switches, gateways, servers, and the like. Alternatively or additionally, the network nodes 120-1 to 120-N may include one or more virtual network nodes, such as (but are not limited to) one or more nodes defined in software-based form like Virtualized Network Functions (VNFs), Cloud-native Network Functions (CNFs), Software Defined Networking (SDN), and the like.

The monitoring system 130 may be communicatively coupled to at least a portion of the network nodes 120, to the thresholds tuning system 110, and to the management system 140. According to embodiments, the monitoring system 130 may be configured to continuously (or periodically) monitor and collect telemetry data or information (e.g., via API calls, etc.) from the portion of the network nodes 120, from the thresholds tuning system 110, and/or from the management system 140.

According to embodiments, the monitoring system 130 may be configured to collect, from the portion of network nodes 120 and/or from the management system 140, data or information associated with one or more capacity factors of the portion of the network nodes 120, and to provide the same to the thresholds tuning system 110 for further processing (further described below). The collected data or information may include values (e.g., in percentage, in actual consumption units, etc.), parameters, or the like, associated with the one or more capacity factors such as computing power, memory, disk storage, transaction processing system, busy hour call attempts, calls per second, and/or any other suitable capacity factor, in the associated network nodes.

Alternatively or additionally, the monitoring system 130 may be configured to collect, from the portion of network nodes 120 and/or from the management system 140, data or information associated with one or more key performance indicators (KPIs) of the portion of the network nodes 120, and to provide the same to the thresholds tuning system 110 for further processing (further described below). The collected data or information may include values, parameters, or the like, associated with the one or more KPIs such as network availability, latency, bandwidth utilization, packet loss, jitter, network throughput, and/or any other suitable KPI, of the associated network nodes.

Alternatively or additionally, the monitoring system 130 may be configured to collect, from the management system 140, data or information associated with user experience of one or more network users, and to provide the same to the thresholds tuning system 110 for further processing (further described below). The collected data or information may include one or more user feedbacks (e.g., one or more complaints from the one or more network users, etc.), one or more incident reports, one or more tickets associated with user experience, value or index defining level of network quality provided to the network users, and/or any other suitable data or information which may define the user experience of the network users.

In some embodiments, the monitoring system 130 may be configured to collect data or information from the thresholds tuning system 110 and the management system 140, and to provide the collected data or information to each other and/or to the network nodes 120 when required.

According to embodiments, the monitoring system 130 may comprise an observability framework which may be configured to provide continuous (or periodical) network observability, in real-time or near real-time. For instance, the observability framework may be configured to collect information, data, logs, metrics, traces, and/or the like associated with one or more of the thresholds tuning system 110, the network nodes 120, and/or the management system 140, to thereby provides comprehensive insights and information thereof in real-time or near real-time.

The management system 140 may include at least one system or module for performing one or more management operations on one or more nodes in the network nodes 120. For instance, the management system 140 may perform one or more of fault management, configuration management, account management, performance management, and security management. According to embodiments, the management system 140 may include at least one operations support system (OSS), at least one element management system (EMS), or a combination thereof. In some implementations, the management system 140 includes an OSS and a plurality of EMSs, each of the plurality of EMSs may be configured to manage a single node or a group of nodes associated with a particular vendor/manufacturer, and the OSS may interface between the thresholds tuning system 110, the monitoring system 130, and the plurality of EMSs.

Alternatively or additionally, the management system 140 may include at least one system or module for managing information associated with network users (e.g., customers or subscribers of the network, etc.). For instance, the management system 140 may include a user management system which continuously (or periodically) receive feedback (e.g., complaint, etc.) from network users regarding the user experience on the network capacity, may include a ticket or incident management system which manage ticket or incident associated with the user experience, and/or the like.

According to embodiments, the monitoring system 130 and/or the management system 140 (or at least a portion of the associated functions or operations) may be implemented or deployed as a part of the thresholds tuning system 110.

The thresholds tuning system 110 may continuously (or periodically) obtain, from the monitoring system 130 and/or from one or more of the plurality of nodes 120-1 to 120-N, data or information associated with one or more capacity factors of one or more of the plurality of nodes 120-1 to 120-N. Accordingly, the thresholds tuning system 110 may determine whether or not the one or more capacity factors violate a plurality of associated thresholds, and to manage the plurality of thresholds accordingly. In some implementations, the thresholds tuning system may, based on the results of the determination, appropriately tune or adjust the plurality of thresholds, or may output, to the management system 140, information associated with one or more actions for managing the one or more of the nodes 120-1 to 120-N.

In this regard, the thresholds tuning system 110 may be deployed in any suitable node, component, or the like, in the network. According to embodiments, the thresholds tuning system 110 may be deployed in a computing platform or environment, as further described below with reference to FIG. 6. Further, several example components which may be included in the thresholds tuning system 110, according to one or more embodiments, are described below with reference to FIG. 2.

Figure 2:
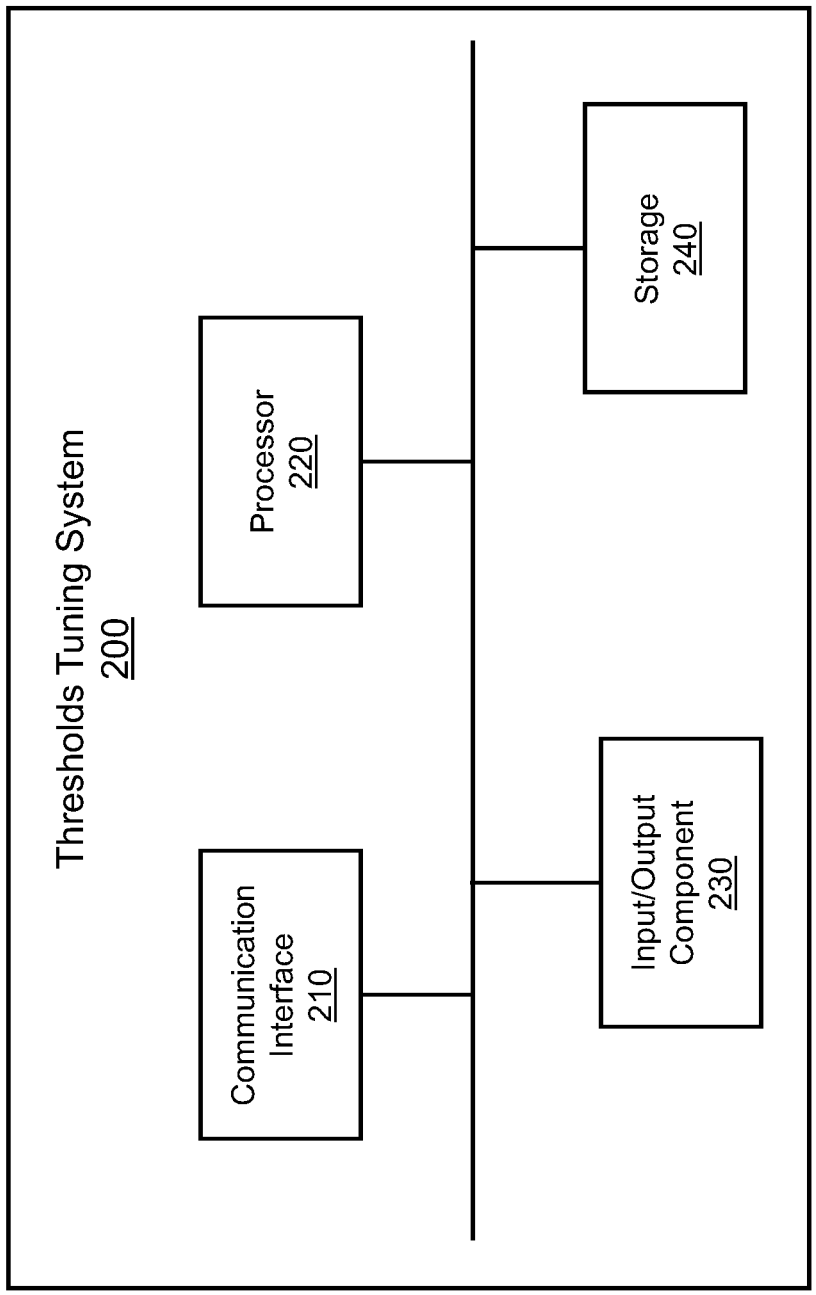
FIG. 2 illustrates a block diagram of example components which may be included in a thresholds tuning system, according to one or more embodiments.

Referring to FIG. 2, a thresholds tuning system 200 (which may correspond to the thresholds tuning system 110 in FIG. 1) may include at least one communication interface 210, at least one processor 220, at least one input/output component 230, and at least one storage 240, although it can be understood that the thresholds tuning system 200 may include more or less components than as illustrated in FIG. 2, and/or may be arranged in a manner different from as illustrated in FIG. 2, without departing from the scope of the present disclosure.

The communication interface 210 may include at least one transceiver-like component (e.g., a transceiver, a separate receiver and transmitter, a bus, etc.) that enables the components of thresholds tuning system 200 to communicate with each other and/or to communicate with one or more components external to the thresholds tuning system 200, such as via a wired connection, a wireless connection, or a combination of wired and wireless connections.

For instance, the communication interface 210 may couple the processor 220 to the storage 240 to thereby enable them to communicate and to interoperate with each other in performing one or more operations. As another example, communication interface 210 may couple the thresholds tuning system 200 (or one or more components included therein) to one or more of the monitoring system 130, the management system 140, and/or to at least a portion of the network nodes 120, so as to enable them to communicate and to interoperate with each other.

According to one or more embodiments, the communication interface 210 may include one or more application programming interfaces (APIs) which allow the thresholds tuning system 200 (or one or more components included therein) to communicate with one or more software applications (e.g., software application deployed in the monitoring system 130, software application deployed in the network nodes 120, etc.).

The input/output component 230 may include at least one component that permits the thresholds tuning system 200 to receive information and/or to provide output information. It can be understood that, in some embodiments, the input/output component 230 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The storage 240 may include one or more storage mediums suitable for storing data, information, and/or computer-executable instructions therein. According to embodiments, the storage 240 may include at least one of a random access memory (RAM), a read only memory (ROM), and/or another type of dynamic or static storage device (e.g., a flash memory, a magnetic memory, and/or an optical memory) that stores information and/or instructions for use by the processor 220. Additionally or alternatively, the storage 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 240 may be configured to store information, such as raw data, metadata, or the like, obtained from one or more of the network nodes 120, the monitoring system 130, and the management system 140. Additionally or alternatively, the storage 240 may be configured to store one or more information processed by the processor 220. For instance, the storage 240 may store one or more thresholds adjusted or tuned by the processor 220, one or more results of operations performed by the processor 220, or the like.

Further, the storage 240 may store data or information required in managing the thresholds. For instance, the storage 240 may store at least one thresholds catalog (further described below with reference to FIG. 4), at least one KPI record including last known value or parameter of one or more KPIs of one or more of the network nodes 120, or the like.

In some implementation, the storage 240 may include a plurality of storage mediums located at different locations, and the storage 240 may be configured to store a duplicate or a copy of at least a portion of the information in the plurality of storage mediums, for providing redundancy and for backing-up the information or the associated data.

Furthermore, the storage 240 may also store computer-readable or computer-executable instructions which, when being executed by one or more processors (e.g., processor 220), causes the one or more processors to perform one or more actions/operations described herein The processor 220 may include at least one processor capable of being programmed or being configured to perform a function(s) or an operation(s) described herein. For instance, the processor 220 may be configured to execute computer-executable instructions stored in at least one storage medium or a memory storage (e.g., storage 240, etc.) to thereby perform one or more actions or one or more operations described herein.

According to embodiments, the processor 220 may be configured to receive (e.g., via the communication interface 210, via the input/output component 230, etc.) one or more signals and/or one or more user inputs defining one or more instructions for performing one or more operations. Further, the processor 220 may be implemented in hardware, firmware, or a combination of hardware and software. For instance, processor 220 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 220 may be configured to collect, to extract, and/or to receive one or more information from the monitoring system 130, the management system 140, and/or at least a portion of the network nodes 120, and to process the received one or more information to thereby manage one or more thresholds associated with one or more capacity factors of the portion of the network nodes 120. Descriptions of several example operations which may be performed by the processor 220 are provided below with reference to FIG. 3 to FIG. 5.

Example Operations for Managing Capacity Thresholds

Figure 3:
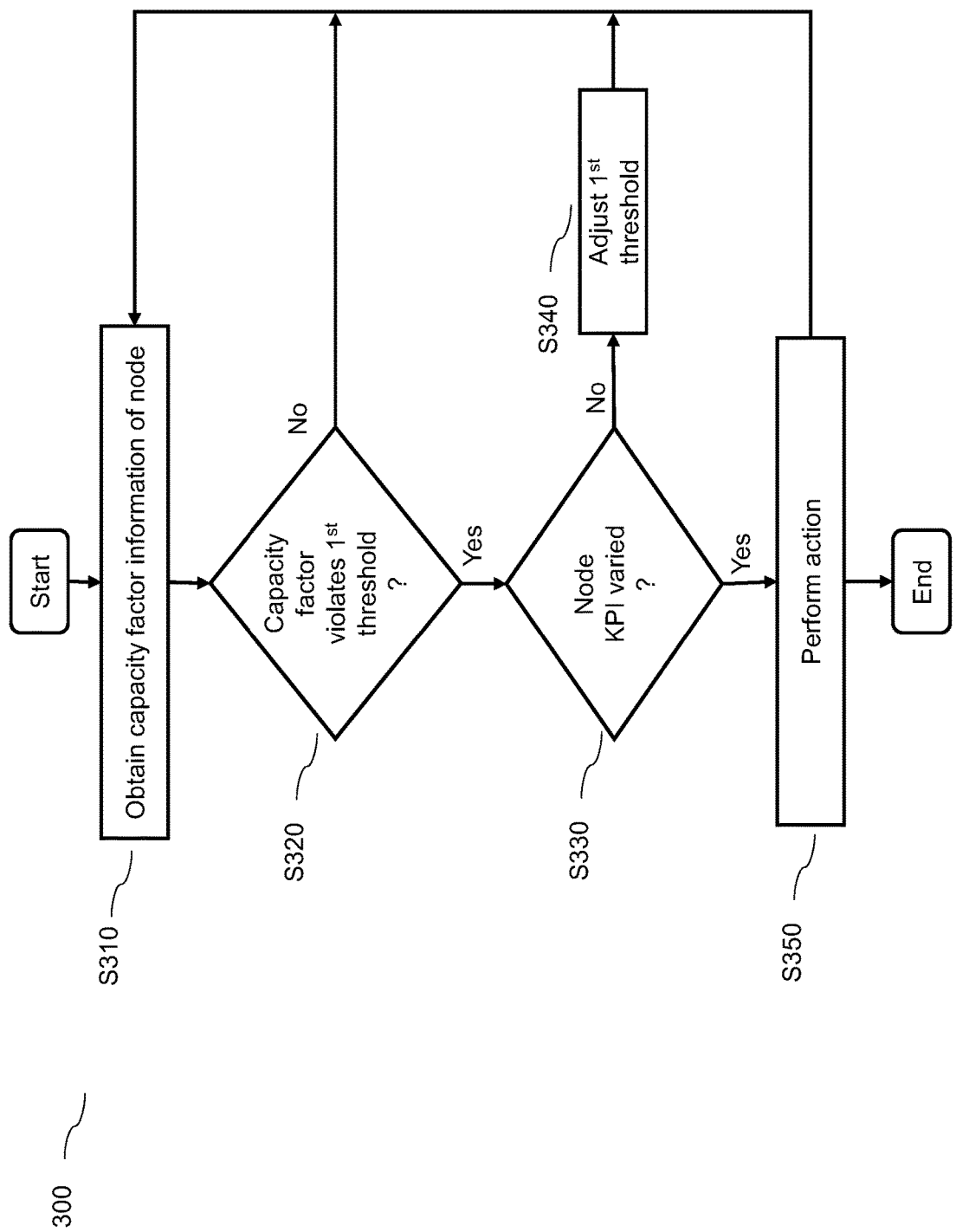
FIG. 3 illustrates a flow diagram of an example method for managing a first threshold associated with at least one capacity factor of at least one node, according to one or more embodiments.

Referring first to FIG. 3, which illustrates a flow diagram of an example method 300 for managing a first threshold associated with at least one capacity factor of at least one node, according to one or more embodiments. It can be understood that one or more operations in method 300 may be performed by the at least one processor 220 of the thresholds tuning system, for managing a first threshold associated with a plurality of capacity factors of a plurality of nodes, in a similar manner as described herein.

As illustrated in FIG. 3, at operation S310, the at least one processor 220 may be configured to obtain information associated with at least one capacity factor of at least one node. According to embodiments, the at least one processor 220 may continuously (or periodically) query, extract, or receive, via the communication interface 210, the information from a monitoring system (e.g., system 130), in real-time or in near real-time. Alternatively or additionally, the at least one processor 220 may directly obtain said information from the at least one node, and/or from one or more storage mediums (e.g., storage 240, etc.) storing the information.

According to embodiments, the obtained information may include values (e.g., in percentage, in actual consumption units, etc.), parameters, or the like, associated with the at least one capacity factor. The capacity factor may include (but is not limited to) computing power, memory, disk storage, transaction processing system, busy hour call attempts, and calls per second, of the at least one node.

At operation S320, the at least one processor 220 may be configured to determine whether the capacity factor violates a first threshold associated with the capacity factor.

According to embodiments, the at least one processor 220 may obtain, from one or more storage mediums (e.g., storage 240, etc.), a thresholds catalog associated with the at least one node, and may then perform operation S320 based on the thresholds catalog and the information obtained at operation S310. Descriptions of an example thresholds catalog are provided below with reference to FIG. 4.

Referring to FIG. 4, which illustrates an example thresholds catalog 400, according to one or more embodiments. The thresholds catalog may be organized or be created as per manufacturer/vendor basis (e.g., all nodes included in the thresholds catalog are associated with a particular manufacture/vendor, etc.), as per node type or node functionality (e.g., all nodes included in the thresholds catalog belong to the same type and/or have the same functionalities, etc.), or the like.

As illustrated in FIG. 4, the thresholds catalog 400 may include a plurality of thresholds (e.g., a first threshold and a second threshold) associated with a plurality of capacity factors (e.g., capacity factor 1 to capacity factor N) of a plurality of nodes (e.g., node 1 to node N), although it can be understood that the information or data included in the thresholds catalog 400 may be provided in a manner different from as illustrated in FIG. 4, without departing from the scope of the present disclosure. For example, each node, each capacity factor, or the like, may have a proprietary thresholds catalog created therefor.

The first threshold of each capacity factor may be a threshold associated with an operation status of the associated node. For instance, the first threshold may be utilized for determining whether or not the associated capacity factor may impact a healthy operation of the node and/or the network. By way of example, based on determining that a parameter (e.g., value, etc.) of the capacity factor 1 of node 1 exceeds the associated first threshold (e.g., Config. 1), the at least one processor 220 may determine that capacity factor 1 violates the associated first threshold and may impact the healthy operation of the node 1 (which may in turn affect the network capacity).

The second threshold of each capacity factor may be a threshold associated with user experience of one or more network users. For instance, the second threshold may be utilized for determining whether or not the capacity factor may impact a user experience of a network user. By way of example, based on determining that a parameter (e.g., value, etc.) of the capacity factor 1 of node 1 exceeds the associated second threshold (e.g., Config. 2), the at least one processor 220 may determine that capacity factor 1 violates the second threshold and may impact the user experience of the network user. According to embodiments, the second threshold may has a configuration or a parameter (e.g., value, etc.) higher than the first threshold.

According to embodiments, the thresholds catalog may include more than two thresholds for one or more capacity factors. For instance, the thresholds catalog may include a third threshold associated with network resiliency, which may be utilized for determining whether or not the respective capacity factor may impact the resiliency of the network. By way of example, based on determining that a parameter (e.g., value, etc.) of the capacity factor 1 of node 1 exceeds the associated third threshold, the at least one processor 220 may determine that capacity factor 1 violates the third threshold and may impact the network resiliency. Accordingly, the at least one processor 220 may raise a flag or may generate an alarm or a message to alert the network operator, or may perform any other suitable action accordingly.

The parameters or configuration of each of the plurality of thresholds may be stored or presented in any suitable units, such as in integer, in percentage, in ratio, in number, in a string of characters, a Boolean value (true or false), or the like. The plurality of thresholds in the thresholds catalog may be initially provided or recommended by the vendor/manufacturer of the nodes, and may be continuously or dynamically adjusted or updated by the at least one processor 220 of the thresholds tuning system, in real-time or near real-time.

Referring back to FIG. 3, at operation S320, the at least one processor 220 may obtain the thresholds catalog and may determine whether the capacity factor (or the associated information/parameter) violates an associated first threshold included in the thresholds catalog. For instance, the at least one processor 220 may determine which of the plurality of capacity factors in the thresholds catalog is associated with the obtained information (e.g., information obtained at operation S310), may determine a first threshold associated with the determined capacity factor, and may then retrieve the parameter (e.g., value, configuration, etc.) of the associated first threshold from the thresholds catalog.

Accordingly, the at least one processor 220 may compare the capacity factor (or the associated information/parameter) with the parameter of the first threshold, so as to determine whether or not the capacity factor is within the first threshold. Simply put, the at least one processor 220 may obtain the thresholds catalog, may determine the first threshold associated with the capacity factor from among a plurality of thresholds included in the thresholds catalog, and may then compare the capacity factor with the first threshold.

Further, based on determining that the capacity factor (or the associated information/parameter) is within the first threshold, the at least one processor 220 may determine that the capacity factor does not violate the first threshold. Conversely, based on determining that the capacity factor equal to or exceeds the first threshold, the at least one processor 220 may determine that the capacity factor violates the first threshold. It is contemplated that the at least one processor 220 may perform any other suitable action(s) or operation(s) to determine whether or not the capacity factor violates the first threshold, without departing from the scope of the present disclosure.

Subsequently, based on determining that the capacity factor does not violate the associated first threshold, the method 300 may return to operation S310 such that the at least one processor 220 of the thresholds tuning system may be configured to repeatedly or iteratively perform method 300, for at least a predetermined amount of time. Alternatively, the method 300 may be terminated or ended.

On the other hand, based on determining that the capacity factor violates the associated first threshold, the method 300 may proceed to operation S330, at which the at least one processor 220 may be configured to verify whether the current parameter/configuration (e.g., current value, etc.) of the first threshold is accurately or appropriately configured.

According to embodiments, at operation S330, the at least one processor 220 may be configured to determine whether at least one KPI associated with the node has varied. For instance, the at least one processor 220 may obtain, from one or more storage mediums (e.g., storage 240), last known information of the at least one KPI, and may obtain, from the monitoring system (e.g., system 130), current information of the at least one KPI. The at least one KPI may include network availability, latency, bandwidth utilization, packet loss, jitter, network throughput, and/or any other suitable KPI.

Accordingly, the at least one processor 220 may compare the current information of the at least one KPI with the last known information of the at least one KPI, to determine whether or not the at least one KPI has varied. If the at least one KPI has not varied or the variation is within an acceptable range, it implies that the healthy operation of the node has not been impacted. Conversely, if the at least one KPI has varied or the variation is not within the acceptable range, it implies that the healthy operation of the node has been impacted.

Thus, based on determining that the at least one KPI associated with the node has not varied, the at least one processor 220 may determine that the current parameter/configuration of the first threshold is not accurately or appropriately configured (e.g., the current parameter/configuration of the first threshold is too conservative and may cause resource wastage, etc.). Accordingly, the method 300 may proceed to operation S340, at which the at least one processor 220 may be configured to adjust or to tune the first threshold. According to embodiments, at operation S340, the at least one processor 220 may increase the first threshold (e.g., increase by 1% from the current value, etc.).

Otherwise, based on determining that the at least one KPI associated with the node has varied, the at least one processor 220 may determine that the current parameter/configuration of the first threshold is accurately or appropriately configured. Accordingly, the method 300 may proceed to operation S350, at which the at least one processor 220 may be configured to perform one or more actions to manage the node so as to mitigate the root cause which impact the healthy operation of the node.

According embodiments, at operation S350, the at least one processor 220 may obtain, from one or more storage mediums (e.g., storage 240), an actions playbook including information of a plurality of actions for managing the node. Accordingly, the at least one processor 220 may select, from the actions playbook, at least one action for managing the node. The plurality of actions may include: restarting the node, redeploying the node (or the associated function) to another component/node (e.g., redeploying a network function from a current server to a backup server, etc.), or the like. In some implementations, the at least one processor 220 may output information associated with the selected at least one action to an element management system (e.g., management system 140) communicatively coupled to the thresholds tuning system, wherein the element management system may be configured to manage the node based on the information associated with the selected action.

Upon completion of operation S340 or operation S350, the method 300 may return to operation S310, such that the at least one processor 220 of the thresholds tuning system may repeatedly or iteratively perform method 300, for at least a predetermined amount of time. Alternatively, method 300 may be terminated or ended.

Figure 5:
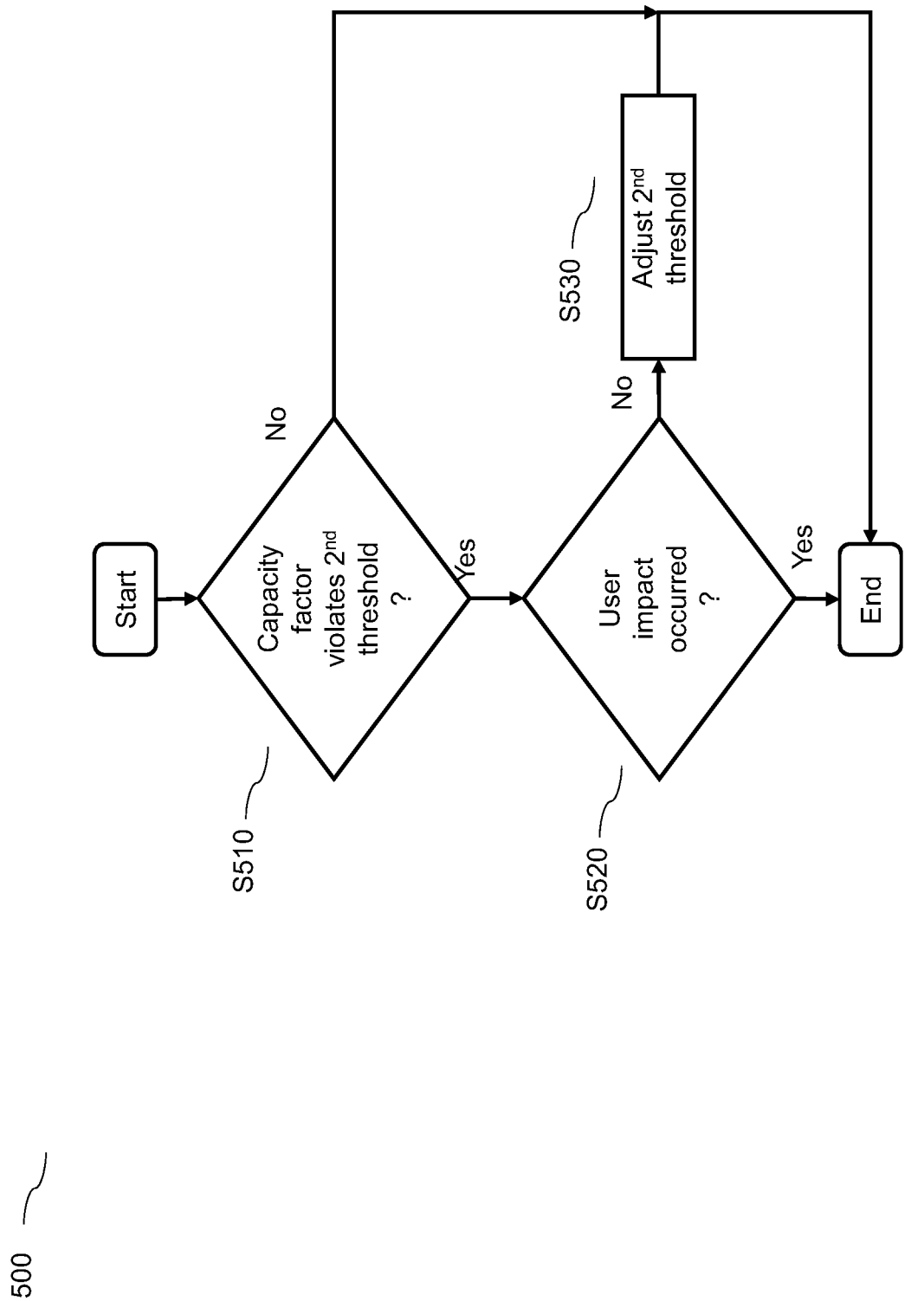
FIG. 5 illustrates a flow diagram of an example method for managing a second threshold associated with at least one capacity factor of at least one node, according to one or more embodiments.

Referring next to FIG. 5, which illustrates a flow diagram of an example method 500 for managing a second threshold associated with at least one capacity factor of at least one node, according to one or more embodiments. It can be understood that one or more operations in method 500 may be performed for managing a second threshold associated with a plurality of capacity factors of a plurality of nodes, in a similar manner as described herein.

Similar to method 300, one or more operations of method 500 may be performed by the at least one processor 220 of the thresholds tuning system. Further, one or more operations of method 500 may be performed subsequent to operation S310 in method 300. For instance, one or more operation of method 500 may be performed concurrently with operation S320, may be performed after any of operations S320-S350, or the like.

As illustrated in FIG. 5, at operation S510, the at least one processor 220 may be configured to determine whether the at least one capacity factor of the at least one node (e.g., capacity factor associated with the information obtained at operation S310) violates a second threshold associated with the capacity factor.

According to embodiments, the at least one processor 220 may be configured to perform operation S510 in a manner similar to operation S320. For instance, the at least one processor 220 may obtain the thresholds catalog and may determine whether or not the capacity factor violates a second threshold included in the thresholds catalog.

By way of example, the at least one processor 220 may determine which of the plurality of capacity factors in the thresholds catalog is associated with the capacity factor defined in the obtained information (e.g., information obtained at operation S310), and may then retrieve the parameter (e.g., value, configuration, etc.) of associated second threshold from the thresholds catalog.

Accordingly, the at least one processor 220 may compare the capacity factor (or the associated information) with the parameter of the second threshold, so as to determine whether or not the capacity factor is within the second threshold. Based on determining that the capacity factor is within the second threshold, the at least one processor 220 may determine that the capacity factor does not violate the second threshold. Conversely, based on determining that the capacity factor equal to or exceeds the second threshold, the at least one processor 220 may determine that the capacity factor violates the second threshold. It is contemplated that the processor 220 may perform any other suitable action(s) or operation(s) to determine whether or not the capacity factor violates the second threshold, without departing from the scope of the present disclosure.

Subsequently, based on determining that the capacity factor does not violate the associated second threshold, the method 500 may return to operation S310 such that the at least one processor 220 may repeatedly or iteratively perform method 500, for at least a predetermined amount of time. Alternatively, the method 500 may be terminated or ended.

On the other hand, based on determining that the capacity factor violates the associated second threshold, the method 500 may proceed to operation S520, at which the at least one processor 220 may be configured to verify whether or not the current parameter/configuration (e.g., current value, etc.) of the second threshold is accurately or appropriately configured.

According to embodiments, at operation S520, the at least one processor 220 may determine whether or not user experience of at least one network user has been impacted. For instance, the at least one processor 220 may send, to one or more storage mediums (e.g., storage 240) or to a management system (e.g., system 140), a request for obtaining information associated with user experience of at least one network user, such as a request for a user feedback (e.g., complaint, etc.) regarding the user experience/network capacity, a request for a ticket or an incident report associated with the node, or the like.

Accordingly, the at least one processor 220 may determine, based on a response for the request (e.g., a user complaint is available/not available, a ticket or incident report is available/not available, etc.), whether or not the user experience of the at least one network user has been impacted. By way of example, based on determining that there is no available user feedback, associated ticket/incident report, or the like, the at least one processor 220 may determine that the user experience has not been impacted. On the other hand, based on determining that there is one or more available user feedbacks, associated ticket/incident report, or the like, the at least one processor 220 may obtain the associated information/data, and may determine (based on said information/data) that the user experience has been impacted.

In this regard, based on determining that the user experience of the at least one network user has not been impacted, the at least one processor 220 may determine that the current parameter/configuration of the second threshold is not accurately or appropriately configured (e.g., the current parameter/configuration of the second threshold is too conservative and may cause resource wastage, etc.). Accordingly, the method 500 may proceed to operation S530, at which the at least one processor 220 may be configured to adjust or to tune the second threshold. According to embodiments, at operation S530, the at least one processor 220 may increase the second threshold (e.g., increase by 1% from the current value, etc.).

Otherwise, based on determining that the user experience of the at least one network user has been impacted, the at least one processor 220 may determine that the current parameter/configuration of the second threshold is accurately or appropriately configured.

Upon completing operations S520 or S530, the method 500 may be terminated or ended. Alternatively, the method 500 may return to operation S310, such that the at least one processor 220 may repeatedly or iteratively perform method 500 (from operation S310), for at least a predetermined amount of time.

It can be understood that one or more operations of method 300 and method 500 may be performed by the at least one processor 220 of the thresholds tuning system to manage a third threshold associated with the capacity factor, a fourth threshold associated with the capacity factor, and the like, in a similar manner as described herein.

For instance, according to embodiments, the at least one processor 220 may determine whether or not the capacity factor violates the associated third threshold, and may perform one or more operations based thereon. By way of example, based on determining that the capacity factor violates the associated third threshold, the processor 220 may raise a flag and/or may generate an alert or an alarming message to notify the associated users (e.g., network operator, etc.).

Example Implementation Environment

Figure 6:
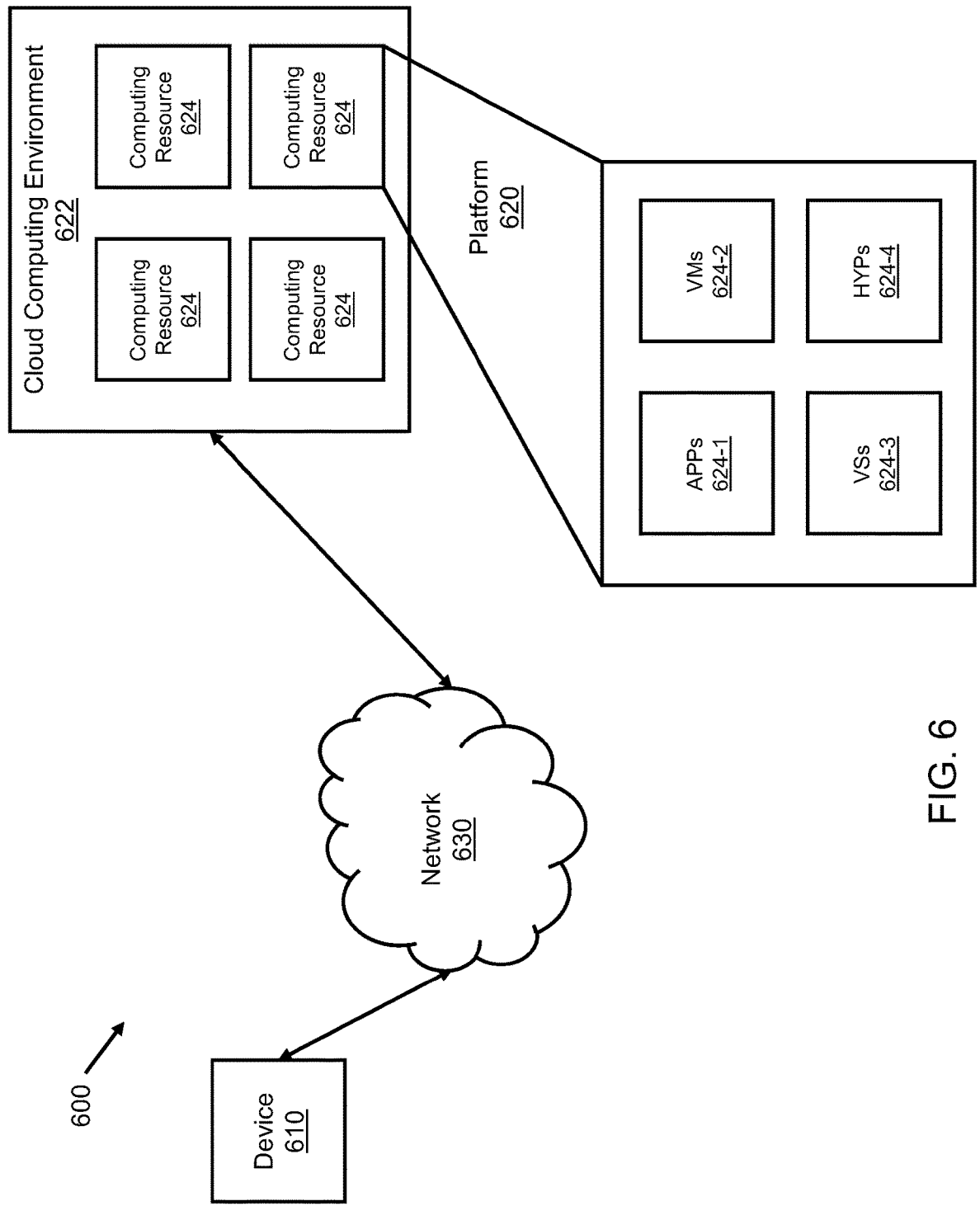
FIG. 6 illustrates a diagram of an example environment in which systems and/or methods, described herein, may be implemented.

FIG. 6 illustrates a diagram of an example environment 600 in which systems and/or methods, described herein, may be implemented. As shown in FIG. 6, environment 600 may include a device 610, a platform 620, and a network 630. Devices or components of environment 600 may interconnect via wired connections, wireless connections, or a combination of wired and wireless connections. In some embodiments, any of the functions and operations described with reference to FIG. 1 to FIG. 5 above may be performed by any combination of elements illustrated in FIG. 6.

According to embodiments, the thresholds tuning system, the monitoring system, the network nodes, and/or the management system described herein may be stored, hosted, or deployed in the cloud computing platform 620. In this regard, device 610 may include a device, system, equipment, or the like, utilized by one or more users (e.g., network users, network operator, node vendors/manufacturers, etc.) to access the thresholds tuning system, the monitoring system, and/or the management system. In that case, device 610 may include one or more devices capable of receiving, generating, storing, processing, and/or providing information associated with platform 620. For example, device 610 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, device 610 may receive information from and/or transmit information to platform 620.

Platform 620 may include one or more devices capable of receiving, generating, storing, processing, and/or providing information. In some implementations, platform 620 may include a cloud server or a group of cloud servers. In some implementations, platform 620 may be designed to be modular such that certain software components may be swapped in or out depending on a particular need. As such, platform 620 may be easily and/or quickly reconfigured for different uses.

In some implementations, as shown, platform 620 may be hosted in cloud computing environment 622. Notably, while implementations described herein describe platform 620 as being hosted in cloud computing environment 622, in some implementations, platform 620 may not be cloud-based (i.e., may be implemented outside of a cloud computing environment) or may be partially cloud-based.

Cloud computing environment 622 may include an environment that hosts platform 620. Cloud computing environment 622 may provide computation, software, data access, storage, etc. services that do not require end-user (e.g., device 610) knowledge of a physical location and configuration of system(s) and/or device(s) that hosts platform 620. As shown, cloud computing environment 622 may include a group of computing resources 624 (referred to collectively as "computing resources 624" and individually as "computing resource 624").

Computing resource 624 may include one or more personal computers, a cluster of computing devices, workstation computers, server devices, or other types of computation and/or communication devices. In some implementations, computing resource 624 may host platform 620. The cloud resources may include compute instances executing in computing resource 624, storage devices provided in computing resource 624, data transfer devices provided by computing resource 624, etc. In some implementations, computing resource 624 may communicate with other computing resources 624 via wired connections, wireless connections, or a combination of wired and wireless connections.

As further shown in FIG. 6, computing resource 624 may include a group of cloud resources, such as one or more applications ("APPs") 624-1, one or more virtual machines ("VMs") 624-2, virtualized storage ("VSs") 624-3, one or more hypervisors ("HYPs") 624-4, or the like.

Application 624-1 may include one or more software applications that may be provided to or accessed by user device 610. Application 624-1 may eliminate a need to install and execute the software applications on user device 610. For example, application 624-1 may include software associated with platform 620 and/or any other software capable of being provided via cloud computing environment 622. In some implementations, one application 624-1 may send/receive information to/from one or more other applications 624-1, via virtual machine 624-2.

Virtual machine 624-2 may include a software implementation of a machine (e.g., a computer) that executes programs like a physical machine. Virtual machine 624-2 may be either a system virtual machine or a process virtual machine, depending upon use and degree of correspondence to any real machine by virtual machine 624-2. A system virtual machine may provide a complete system platform that supports execution of a complete operating system ("OS"). A process virtual machine may execute a single program, and may support a single process. In some implementations, virtual machine 624-2 may execute on behalf of a user (e.g., user device 610), and may manage infrastructure of cloud computing environment 622, such as data management, synchronization, or long-duration data transfers.

Virtualized storage 624-3 may include one or more storage systems and/or one or more devices that use virtualization techniques within the storage systems or devices of computing resource 624. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 624-4 may provide hardware virtualization techniques that allow multiple operating systems (e.g., "guest operating systems") to execute concurrently on a host computer, such as computing resource 624. Hypervisor 624-4 may present a virtual operating platform to the guest operating systems, and may manage the execution of the guest operating systems. Multiple instances of a variety of operating systems may share virtualized hardware resources.

Network 630 may include one or more wired and/or wireless networks. For example, network 630 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

VARIOUS ASPECTS OF EMBODIMENTS

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various further respective aspects and features of embodiments of the present disclosure may be defined by the following items:

Item [1]: A system including: a memory storage storing computer-executable instructions; and at least one processor communicatively coupled to the memory storage, wherein the at least one processor may be configured to execute the instructions to: obtain information associated with a capacity factor of a node; determine, based on the received information, whether the capacity factor violates an associated first threshold; based on determining that the capacity factor violates the first threshold, determine whether a key performance indicator (KPI) associated with the node has varied; based on determining that the KPI has not varied, adjust the first threshold; and based on determining that the KPI has varied, perform an action to manage the node.

Item [2]: The system according to item [1], wherein the at least one processor may be configured to execute the instructions to adjust the first threshold by increasing the first threshold.

Item [3]: The system according to any one of items [1]-[2], wherein the at least one processor may be configured to execute the instructions to perform the action by: obtaining an actions playbook including a plurality of actions for managing the node; selecting, from the actions playbook, an action for managing the node; and outputting information associated with the selected action to an element management system communicatively coupled to the system, wherein the element management system may be configured to manage the node based on the information associated with the selected action.

Item [4]: The system according to any one of items [1]-[3], wherein the at least one processor may be configured to execute the instructions to determine whether the capacity factor violates the associated first threshold by: obtaining a thresholds catalog including a plurality of thresholds associated with the capacity factor of the node; determining a first threshold from among the plurality of thresholds; comparing the capacity factor with the first threshold; based on determining that the capacity factor is within the first threshold, determining that the capacity factor does not violate the first threshold; and based on determining that the capacity factor is equal to or exceeds the first threshold, determining that the capacity factor violates the first threshold.

Item [5]: The system according to any one of items [1]-[4], wherein the at least one processor may be further configured to execute the instructions to: determine, based on the obtained information, whether the capacity factor violates an associated second threshold; based on determining that the capacity factor violates the second threshold, determine whether user experience of at least one network user has been impacted; and based on determining that the user experience has not been impacted, adjust the second threshold.

Item [6]: The system according to item [5], wherein the at least one processor may be configured to execute the instructions to adjust the second threshold by increasing the second threshold.

Item [7]: The system according to any one of items [5]-[6], wherein the at least one processor may be configured to execute the instructions to determine whether the capacity factor violates the associated second threshold by: obtaining a thresholds catalog including a plurality of thresholds associated with the capacity factor of the node; determining a second threshold from among the plurality of thresholds; comparing the capacity factor with the second threshold; based on determining that the capacity factor is within the second threshold, determining that the capacity factor does not violate the second threshold; and based on determining that the capacity factor is equal to or exceeds the second threshold, determining that the capacity factor violates the second threshold.

Item [8]: The system according to any one of items [5]-[7], wherein the at least one processor may be configured to execute the instructions to determine whether the user experience has been impacted by: determining whether at least one user's complaint is available; based on determining that at least one user's complaint is available, determining that the user experience has been impacted; and based on determining that no user's complaint is available, determining that the user experience has not been impacted.

Item [9]: A method, performed by at least one processor of a system, including: obtaining information associated with a capacity factor of a node; determining, based on the obtained information, whether the capacity factor violates an associated first threshold; based on determining that the capacity factor violates the first threshold, determining whether a key performance indicator (KPI) associated with the node has varied; based on determining that the KPI has not varied, adjusting the first threshold; and based on determining that the KPI has varied, performing an action to manage the node.

Item [10]: The method according to item [9], wherein the adjusting the first threshold may include increasing the first threshold.

Item [11]: The method according to any one of items [9]-[10], wherein the performing the action may include: obtaining an actions playbook including a plurality of actions for managing the node; selecting, from the actions playbook, an action for managing the node; and outputting information associated with the selected action to an element management system communicatively coupled to the system, wherein the element management system may be configured to manage the node based on the information associated with the selected action.

Item [12]: The method according to any one of items [9]-[11], wherein the determining whether the capacity factor violates the associated first threshold may include: obtaining a thresholds catalog including a plurality of thresholds associated with the capacity factor of the node; determining a first threshold from among the plurality of thresholds; comparing the capacity factor with the first threshold; based on determining that the capacity factor is within the first threshold, determining that the capacity factor does not violate the first threshold; and based on determining that the capacity factor is equal to or exceeds the first threshold, determining that the capacity factor violates the first threshold.

Item [13]: The method according to any one of items [9]-[12], further including: determining, based on the obtained information, whether the capacity factor violates an associated second threshold; based on determining that the capacity factor violates the second threshold, determining whether user experience of at least one network user has been impacted; and based on determining that the user experience has not been impacted, adjusting the second threshold.

Item [14]: The method according to item [13], wherein the adjusting the second threshold may include increasing the second threshold.

Item [15]: The method according to any one of items [13]-[14], wherein the determining whether the capacity factor violates the associated second threshold may include: obtaining a thresholds catalog including a plurality of thresholds associated with the capacity factor of the node; determining a second threshold from among the plurality of thresholds; comparing the capacity factor with the second threshold; based on determining that the capacity factor is within the second threshold, determining that the capacity factor does not violate the second threshold; and based on determining that the capacity factor is equal to or exceeds the second threshold, determining that the capacity factor violates the second threshold.

Item [16]: The method according to any one of items [13]-[15], wherein the determining whether the user experience has been impacted may include: determining whether at least one user's complaint is available; based on determining that at least one user's complaint is available, determining that the user experience has been impacted; and based on determining that no user's complaint is available, determining that the user experience has not been impacted.

Item [17]: A non-transitory computer-readable recording medium having recorded thereon instructions executable by at least one processor of a system to cause the at least one processor to perform a method including: obtaining information associated with a capacity factor of a node; determining, based on the obtained information, whether the capacity factor violates an associated first threshold; based on determining that the capacity factor violates the first threshold, determining whether a key performance indicator (KPI) associated with the node has varied; based on determining that the KPI has not varied, adjusting the first threshold; and based on determining that the KPI has varied, performing an action to manage the node.

Item [18]: The non-transitory computer-readable recording medium according to item [17], wherein the adjusting the first threshold may include increasing the first threshold.

Item [19]: The non-transitory computer-readable recording medium according to any one of items [17]-[18], wherein the performing the action may include: obtaining an actions playbook including a plurality of actions for managing the node; selecting, from the actions playbook, an action for managing the node; and outputting information associated with the selected action to an element management system communicatively coupled to the system, wherein the element management system may be configured to manage the node based on the information associated with the selected action.

Item [20]: The non-transitory computer-readable recording medium according to any one of items [17]-[20], wherein the determining whether the capacity factor violates the associated first threshold may include: obtaining a thresholds catalog including a plurality of thresholds associated with the capacity factor of the node; determining a first threshold from among the plurality of thresholds; comparing the capacity factor with the first threshold; based on determining that the capacity factor is within the first threshold, determining that the capacity factor does not violate the first threshold; and based on determining that the capacity factor is equal to or exceeds the first threshold, determining that the capacity factor violates the first threshold.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system, comprising:
   a memory storage storing computer-executable instructions; and
   at least one processor communicatively coupled to the memory storage, wherein the at least one processor is configured to execute the instructions to:
   obtain information associated with a capacity factor of a node, wherein the capacity factor of the node comprises busy hour call attempts or calls per second;
   determine, based on the obtained information, that the capacity factor violates an associated first threshold;
   in response to determining that the capacity factor violates the first threshold, determine that a key performance indicator (KPI) associated with the node has not varied, wherein the KPI comprises packet loss or jitter;
   in response to determining that the KPI associated with the node has not varied, adjust the first threshold by increasing the first threshold;
   determine, based on the obtained information, that the capacity factor violates an associated second threshold;
   in response to determining that the capacity factor violates the second threshold, determine that user experience of at least one network user has not been impacted, wherein the user experience is associated with a complaint, a ticket associated with the node or an incident report associated with the node; and
   in response to determining that the user experience has not been impacted, adjust the second threshold.

2. The system according to claim 1, wherein the at least one processor is configured to execute the instructions to determine that the capacity factor violates the associated first threshold by:
   obtaining a thresholds catalog including a plurality of thresholds associated with the capacity factor of the node;
   determining a first threshold from among the plurality of thresholds;
   comparing the capacity factor with the first threshold;
   based on a first determining that the capacity factor is less than the first threshold, determining that the capacity factor does not violate the first threshold; and
   based on a second determining that the capacity factor is equal to or exceeds the first threshold, determining that the capacity factor violates the first threshold.

3. The system according to claim 1, wherein the at least one processor is configured to execute the instructions to adjust the second threshold by increasing the second threshold.

4. The system according to claim 1, wherein the at least one processor is configured to execute the instructions to determine that the capacity factor violates the associated second threshold by:
   obtaining a thresholds catalog including a plurality of thresholds associated with the capacity factor of the node;
   determining a second threshold from among the plurality of thresholds;
   comparing the capacity factor with the second threshold;
   based on a third determining that the capacity factor is within the second threshold, determining that the capacity factor does not violate the second threshold; and
   based on a fourth determining that the capacity factor is equal to or exceeds the second threshold, determining that the capacity factor violates the second threshold.

5. A method, performed by at least one processor of a system, comprising:
   obtaining information associated with a capacity factor of a node, wherein the capacity factor of the node comprises busy hour call attempts or calls per second;
   determining, based on the obtained information, that the capacity factor violates an associated first threshold;
   in response to determining that the capacity factor violates the first threshold, determining that a key performance indicator (KPI) associated with the node has not varied, wherein the KPI comprises packet loss or jitter;
   in response to determining that the KPI associated with the node has not varied, adjusting the first threshold by increasing the first threshold;
   determining, based on the obtained information, that the capacity factor violates an associated second threshold;
   in response to determining that the capacity factor violates the second threshold, determining that user experience of at least one network user has not been impacted, wherein the user experience is associated with a complaint, a ticket associated with the node or an incident report associated with the node; and
   in response to determining that the user experience has not been impacted, adjusting the second threshold.

6. The method according to claim 5, wherein the determining that the capacity factor violates the associated first threshold comprises:
   obtaining a thresholds catalog including a plurality of thresholds associated with the capacity factor of the node;
   determining a first threshold from among the plurality of thresholds;
   comparing the capacity factor with the first threshold;
   based on a first determining that the capacity factor is within the first threshold, determining that the capacity factor does not violate the first threshold; and
   based on a second determining that the capacity factor is equal to or exceeds the first threshold, determining that the capacity factor violates the first threshold.

7. The method according to claim 5, wherein the adjusting the second threshold comprises increasing the second threshold.

8. A non-transitory computer-readable recording medium having recorded thereon instructions executable by at least one processor of a system to cause the at least one processor to perform a method comprising:
- obtaining information associated with a capacity factor of a node, wherein the capacity factor of the node comprises busy hour call attempts or calls per second;
- determining, based on the obtained information, that the capacity factor violates an associated first threshold;
- in response to determining that the capacity factor violates the first threshold, determining that a key performance indicator (KPI) associated with the node has not varied, wherein the KPI comprises packet loss or jitter;
- in response to determining that the KPI associated with the node has not varied, adjusting the first threshold by increasing the first threshold;
- determining, based on the obtained information, that the capacity factor violates an associated second threshold;
- in response to determining that the capacity factor violates the second threshold, determining that user experience of at least one network user has not been impacted, wherein the user experience is associated with a complaint, a ticket associated with the node or an incident report associated with the node; and
- in response to determining that the user experience has not been impacted, adjusting the second threshold.

9. The non-transitory computer-readable recording medium according to claim 8, wherein the determining that the capacity factor violates the associated first threshold comprises:
- obtaining a thresholds catalog including a plurality of thresholds associated with the capacity factor of the node;
- determining a first threshold from among the plurality of thresholds;
- comparing the capacity factor with the first threshold;
- based on a first determining that the capacity factor is within the first threshold, determining that the capacity factor does not violate the first threshold; and
- based on a second determining that the capacity factor is equal to or exceeds the first threshold, determining that the capacity factor violates the first threshold.

* * * * *